US012601629B2

(12) United States Patent　　(10) Patent No.:　US 12,601,629 B2
DeCook et al.　　　　　　　　　(45) Date of Patent:　　Apr. 14, 2026

(54) MODULAR MONITOR

(71) Applicant: ITT Manufacturing Enterprises LLC,
Wilmington, DE (US)

(72) Inventors: Bradley DeCook, Victor, NY (US);
Daniel Kernan, Liverpool, NY (US);
Naveen George, Rochester, NY (US);
James Reitano, Farmington, NY (US)

(73) Assignee: Poseidon Systems, LLC, Victor, NY
(US)

( * ) Notice: Subject to any disclaimer, the term of this
patent is extended or adjusted under 35
U.S.C. 154(b) by 405 days.

(21) Appl. No.: 18/032,971

(22) PCT Filed: Oct. 28, 2020

(86) PCT No.: PCT/US2020/057648
§ 371 (c)(1),
(2) Date: Apr. 20, 2023

(87) PCT Pub. No.: WO2022/093208
PCT Pub. Date: May 5, 2022

(65) Prior Publication Data
US 2023/0392978 A1　　Dec. 7, 2023

(51) Int. Cl.
G01H 1/00　　　　(2006.01)
G01D 11/24　　　　(2006.01)
(Continued)

(52) U.S. Cl.
CPC ............. G01H 1/003 (2013.01); G01D 21/02
(2013.01); G01M 13/045 (2013.01); G01D
11/245 (2013.01)

(58) Field of Classification Search
None
See application file for complete search history.

(56) References Cited

U.S. PATENT DOCUMENTS 5,726,911 A　　3/1998　Canada et al.
5,841,255 A　*　11/1998　Canada ................. H02K 11/25
　　　　　　　　　　　　　　　　　　　　318/647

(Continued)

FOREIGN PATENT DOCUMENTS

WO　　2014118540 A2　8/2014
WO　　2018198111 A1　11/2018
WO　　2020128685 A1　6/2020

OTHER PUBLICATIONS

International Search Report in corresponding International Patent
Application No. PCT/US2020/057648 dated Feb. 17, 2021.
(Continued)

*Primary Examiner* — Huy Q Phan
*Assistant Examiner* — Carl F. R. Tchatchouang

(57)　　　　　ABSTRACT

Technologies are described for devices to monitor a
machine. The devices may comprise a battery pack module
including a battery pack housing and a sensor module
including a sensor module housing and a circuit board. The
circuit board may include a substrate, a vibration sensor, a
temperature sensor, a motor flux sensor, an ultrasonic sensor,
and a processor. The vibration sensor may produce a vibra-
tion signal relating to vibration of the machine. The tem-
perature sensor may produce a temperature signal relating to
a temperature detected. The motor flux sensor may produce
a motor flux signal relating to an amount of motor flux
emitted by the machine. The ultrasonic sensor may produce
an ultrasonic signal relating to ultrasonic waves reflected
back from the machine. The processor may be in commu-
nication with the vibration sensor, the temperature sensor,
the motor flux sensor, and the ultrasonic sensor.

10 Claims, 7 Drawing Sheets

(51) Int. Cl.
    *G01D 21/02*       (2006.01)
    *G01M 13/045*    (2019.01)

(56)         References Cited

U.S. PATENT DOCUMENTS

| | | | | |
|---|---|---|---|---|
| 5,852,351 | A * | 12/1998 | Canada | H02K 11/35 |
| | | | | 702/56 |
| 6,295,510 | B1 * | 9/2001 | Discenzo | H02P 9/02 |
| | | | | 702/183 |
| 9,857,274 | B2 * | 1/2018 | Zapf | G01D 21/02 |
| 2006/0238332 | A1 | 10/2006 | Carle et al. | |
| 2012/0272763 | A1 | 11/2012 | Murakami | |
| 2013/0034120 | A1 * | 2/2013 | Hentschel | G01K 1/20 |
| | | | | 374/142 |
| 2015/0211581 | A1 | 7/2015 | Murphy et al. | |
| 2015/0211916 | A1 | 7/2015 | McGinn et al. | |
| 2015/0226805 | A1 | 8/2015 | Albers et al. | |
| 2015/0248123 | A1 | 9/2015 | Tezuka et al. | |

| | | | | |
|---|---|---|---|---|
| 2016/0228060 | A1 | 8/2016 | Mazar et al. | |
| 2017/0176537 | A1 | 6/2017 | Orman et al. | |
| 2017/0370792 | A1 | 12/2017 | Hasunuma | |
| 2018/0113218 | A1 | 4/2018 | Albers et al. | |
| 2018/0284758 | A1 * | 10/2018 | Cella | G05B 23/0264 |
| 2019/0166413 | A1 | 5/2019 | Klinger et al. | |
| 2019/0317055 | A1 | 10/2019 | Albers et al. | |
| 2020/0133257 | A1 * | 4/2020 | Cella | G05B 19/4183 |
| 2020/0192338 | A1 | 6/2020 | Mangino | |
| 2021/0164828 | A1 * | 6/2021 | Gu | G01H 1/003 |

OTHER PUBLICATIONS

Extended European Search Report issued in European Patent Application No. 20960123.6 dated May 27, 2024.
International Preliminary Report on Patentability issued in correspondence International PCT Application No. PCT/US2020/057648 dated May 2, 2023.

* cited by examiner

MODULAR MONITOR

BACKGROUND

Unless otherwise indicated herein, the materials described in this section are not prior art to the claims in this application and are not admitted to be prior art by inclusion in this section.

Rotating machinery such as motors, pumps, and fans may be used in manufacturing and industrial environments. Machine failures may cost businesses for both the repair as well as lost production time. Monitoring equipment may help prevent or lessen machine failures. Monitoring equipment may also provide data for better scheduling of planned maintenance for equipment.

SUMMARY

One embodiment of the invention is a device to monitor a machine. The device may comprise a battery pack module and a sensor module. The battery pack module may include a battery pack housing. The sensor module may include a sensor module housing. The battery pack housing may be attachable and removable from the sensor module housing. The sensor module may include at least one circuit board. The at least one circuit board may include a substrate, a vibration sensor mounted on the substrate, a temperature sensor mounted on the substrate, a motor flux sensor mounted on the substrate, and a processor mounted on the substrate. The vibration sensor may be effective to produce a vibration signal relating to vibration of the machine. The temperature sensor may be effective to produce a temperature signal relating to a temperature detected. The motor flux sensor may be effective to produce a motor flux signal relating to an amount of motor flux emitted by the machine. The processor may be in communication with the vibration sensor, the temperature sensor, and the motor flux sensor.

Another embodiment of the invention includes a device to monitor a machine. The device may comprise a battery pack module. The sensor module may include a housing that is attachable and removable from the battery pack module. The battery pack module may include a battery pack housing. The battery pack housing may be configured to be attachable and removable from a sensor module housing. The device may comprise a sensor module. The sensor module may include a sensor module housing. The sensor module may include at least one circuit board. The at least one circuit board may include a substrate, a vibration sensor mounted on the substrate, a temperature sensor mounted on the substrate, a motor flux sensor mounted on the substrate, and a processor mounted on the substrate. The vibration sensor may be effective to produce a vibration signal relating to vibration of the machine. The temperature sensor may be effective to produce a temperature signal relating to a temperature detected. The motor flux sensor may be effective to produce a motor flux signal relating to an amount of motor flux emitted by the machine. The processor may be in communication with the vibration sensor, the temperature sensor, and the motor flux sensor.

Another embodiment of the invention is a method to monitor a machine. The method may comprise attaching a monitor to the machine. The monitor may include a cover, a battery pack module, a vibration sensor, a temperature sensor, a motor flux sensor, a processor, a Bluetooth unit, and a cellular unit. The method may comprise detecting a vibration frequency of the machine. The method may comprise detecting a difference in temperature between a temperature of a surface of the machine and ambient air. The method may comprise detecting an amount of magnetic flux emitted by the machine. The method may comprise generating monitoring data. The method may comprise sending the monitoring data to a device over a network. The method may comprise analyzing the monitoring data by the device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a side exploded view of a modular monitor;

DETAILED DESCRIPTION

Figure 1:
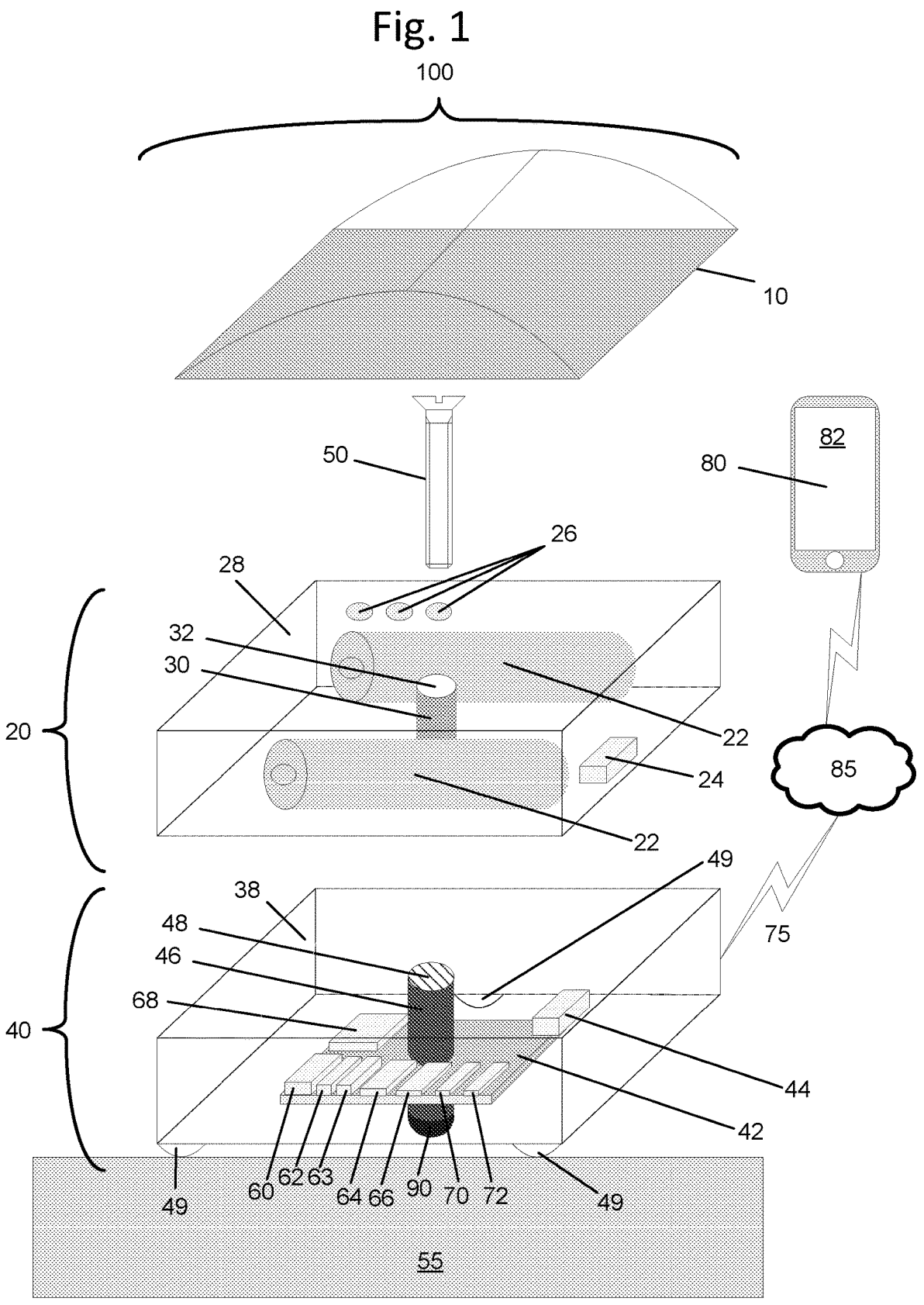
FIG. 1 is a side exploded view of a modular monitor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a side exploded view of a modular monitor, arranged in accordance with at least some embodiments described herein. Monitor 100 may include a cover 10, a battery pack module 20, and a sensor and communication module 40. Monitor 100 may be attached to a machine 55, such as a pump, and may monitor characteristics of machine 55. Battery pack module 20 may include a box shaped housing 28, one or more batteries 22, an electrical connector 24, and one or more indicators 26. Housing 28 may include walls 30 defining a screw column 32 which may allow a screw 50 to secure battery pack module 20 to another module such as sensor and communication module 40. Battery pack module 20 may be attachable and removable from another module such as sensor and communication module 40. Housing 28 may be configured so that cover 10 may be attached to housing 28 by clipping or snapping onto housing 28. Screw column 30 may be centered in housing 28. Sensor and communication module 40 may include a box shaped housing 38, a sensor and communication printed circuit board assembly (PCBA) 42, and an electric connector 44. Housing 38 may include walls 46 which may define center screw mount 48. Center screw mount 48 may be configured to threadedly receive a screw such as screw 50. Housing 38 may further include mount feet 49. Mount feet 49 may be part of a three point mount and may provide a stiff connection to machine for high frequency detection. Monitor 100 may include a threaded mount fastener. Monitor 100 may further include a magnetic mount 90. Magnetic mount 90 may be a rare earth magnet. Magnetic mount 90 may secure monitor 100 to a metal surface of machine 55 or may facilitate mounting with embedded rare earth magnets within the machine.

Monitor 100 including cover 10, battery pack module 20 and sensor and communication module 40 may be waterproof at connections between cover 10, battery pack module 20 and sensor and communication module 40. Monitor 100 may comply with ingress protection standard IP68 and IP69K. Monitor 100 may be compliant with class 1, division 1 or class 1, division 2 work environments.

Cover 10 may be plastic and may be translucent or frosted. Cover 10 may be printed or embossed with a brand. Indicators 26 may be light emitting diodes (LEDs) and may be visible through cover 10 when one or more indicators 26 light up. Indicators 26 may light up within cover 10 and a color of an indicator 26 may be seen through cover 10. For example, an indicator 26 of the monitor may be a green LED, may be lit to indicate a status of monitor 100. Cover 10 may be illuminated green by indicator 26 revealing green as a status of monitor 100. Battery pack module 20 and batteries 22 may be replaceable. Batteries 22 may be rechargeable.

Sensor and communication printed circuit board assembly (PCBA) 42 may include a substrate, a vibration sensor 60, a temperature sensor 62, a temperature sensor 63, a motor flux sensor 64, an ultrasonic sensor 66, a processor 68, a Bluetooth unit 70, and a cellular unit 72. Vibration sensor 60, temperature sensor 62, temperature sensor 63, motor flux sensor 64, ultrasonic sensor 66, processor 68, Bluetooth unit 70, and cellular unit 72 may each be mounted on the substrate. Vibration sensor 60 may detect a vibration frequency in three axes. Vibration sensor 60 may be effective to detect a vibration frequency in a range of 2 Hz To 4 kHz. Vibration sensor 60 may be effective to produce a vibration signal relating to vibration of machine 55. Temperature sensor 62 may detect a temperature near a surface of machine 55. Temperature sensor 63 may detect a temperature of ambient air around monitor 100. Temperature sensor 62 and temperature sensor 63 may detect a difference in temperature between temperature of a surface of machine 55 and ambient air. Temperature sensor 62 and temperature sensor 63 may each be effective to produce a temperature signal relating to a temperature detected. Motor flux sensor 64 may detect an amount of magnetic flux emitted by machine 55. Motor flux sensor 64 may be effective to produce a motor flux signal relating to an amount of motor flux emitted by machine 55. Ultrasonic sensor 66 may emit ultrasonic waves toward machine 55 and may receive reflected ultrasonic waves reflected back from machine 55. Ultrasonic sensor 55 may monitor bearings of machine 55. Ultrasonic sensor 66 may be effective to produce an ultrasonic signal relating to ultrasonic waves reflected back from machine 55. Processor 68 may be in communication with vibration sensor 60, temperature sensor 62, temperature sensor 63, motor flux sensor 64, and ultrasonic sensor 66.

Processor 68 may receive vibration signal from vibration sensor 60, temperature signal from temperature sensor 62, temperature signal from temperature sensor 63, motor flux signal from motor flux sensor 64, and ultrasonic signal from ultrasonic sensor 66. Processor 68 may generate monitoring data 75 based on information collected from signals received from vibration sensor 60, temperature sensor 62, temperature sensor 63, motor flux sensor 64, and ultrasonic sensor 66. Monitoring data 75 may be a composite signal which includes all data collected from vibration sensor 60, temperature sensor 62, temperature sensor 63, motor flux sensor 64, and ultrasonic sensor 66 by processor 68. Monitor 100 may be in communication with a smartphone 80 or other device, such as a device on a cloud network, over a network 85. Network 85 may be a local network, a Bluetooth network, a cellular network, a direct connection, a Wi-Fi network, etc. Bluetooth unit 70 may provide Bluetooth low energy communication capabilities for monitor 100. Cellular unit 72 may provide Wi-Fi and cellular communication abilities for monitor 100. Cellular unit 72 providing Wi-Fi and cellular communication abilities may allow monitor 100 to send monitoring data 75 generated by vibration sensor 60, temperature sensor 62, temperature sensor 63, motor flux sensor 64, and ultrasonic sensor 66 through, for example, a cellular communication network using communication protocols such as 4G, LTE (long term evolution) or 5G. Cellular unit 72 providing cellular communication abilities may allow monitor 100 to communicate with smartphone 80 or another device and send monitoring data 75 to smartphone 80 or another device over a connection range that could effectively be worldwide. Monitor 100 may communicate with smartphone 80 or other device, such as a device on a cloud network, on a continuing basis or on a monitoring interval. A monitoring interval may be adjustable from 5 seconds to 1 hour. Smartphone 80 or other device, such as a device on a cloud network, may include a program or application 82 for analyzing data 75. A processor of smartphone 80 or cloud device may execute application 82 and generate motor analytics and pump analytics based on data 75 generated by vibration sensor 60, temperature sensor 62, temperature sensor 63, motor flux sensor 64, and ultrasonic sensor 66. A processor of smartphone 80 may execute application 82 and determine a fault based on a frequency within the magnetic flux emitted by machine 55 as detected by motor flux sensor 64. A processor of smartphone 80 may execute application 82 and detect defects in the bearings such as bearing faults, wear in the bearings, flat spots in the bearings, or seizing of the bearings based on the reflected ultrasonic waves as detected by ultrasonic sensor 66.

Figure 2:
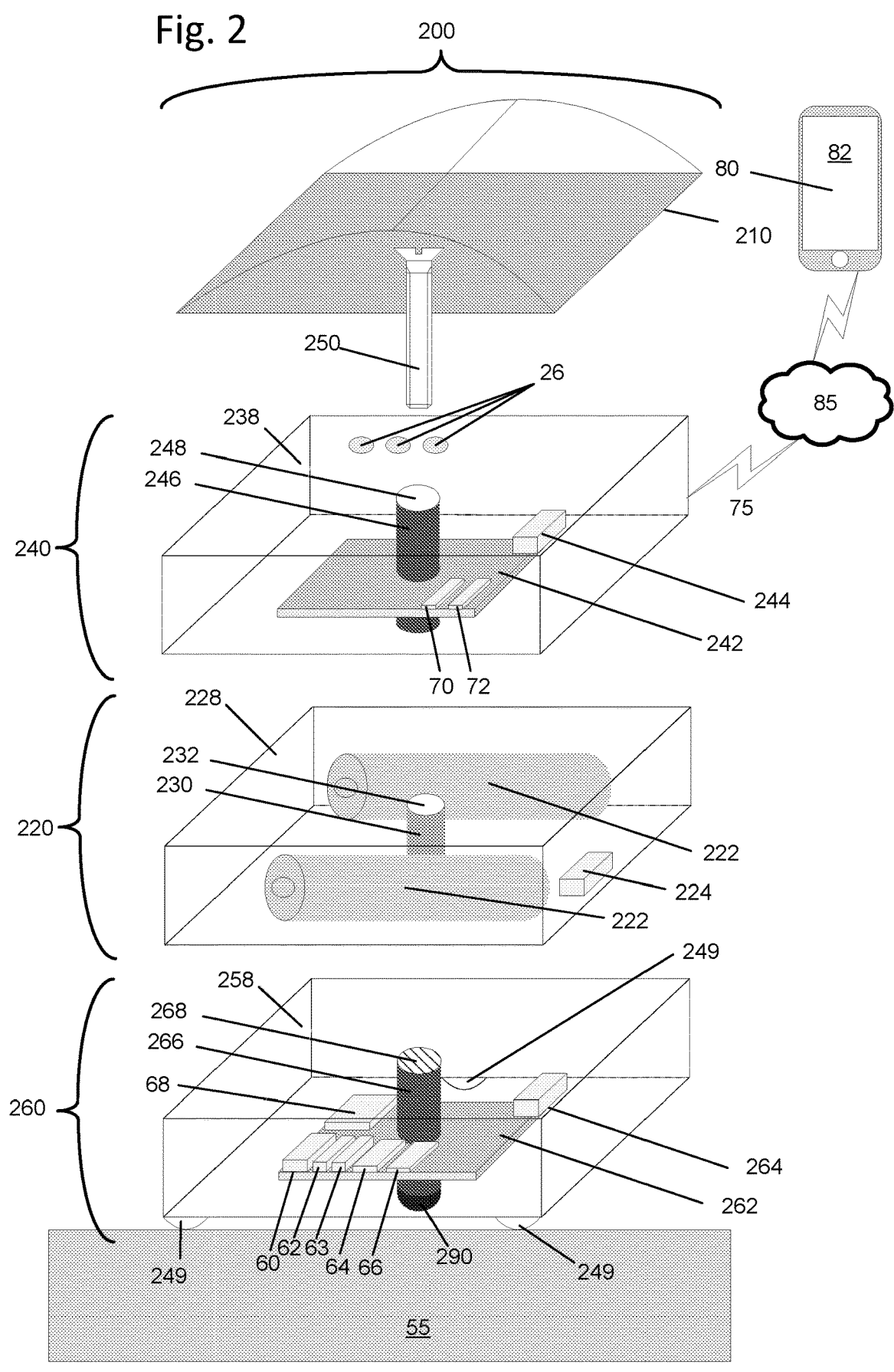
FIG. 2 is a side exploded view of a modular monitor.

FIG. 2 is a side exploded view of a modular monitor, arranged in accordance with at least some embodiments described herein. Those components in FIG. 2 that are labeled identically to components of FIG. 1 will not be described again for the purposes of brevity.

Monitor 200 may include a cover 210, a communication module 240, a battery pack module 220, and a sensor module 260. Monitor 200 may be attached to machine 55 and may monitor characteristics of machine 55. Monitor 200 may be waterproof at connections between cover 210, communication module 240, battery pack module 220, and sensor module 260. Monitor 200 may comply with ingress protection standard IP68 and IP69K. Monitor 200 may be compliant with class 1, division 1 or class 1, division 2 work environments.

Communication module 240 may include a box shaped housing 238, a communication printed circuit board assembly (PCBA) 242, an electric connector 244, and one or more indicators 26. Indicators 26 may be light emitting diodes (LEDs). Housing 238 may include walls 246 which may define a center screw column 248. Center screw column 248 may allow a screw, such as screw 250, to secure communication module 240 to one or more other modules such as battery pack module 220 and sensor module 260. Battery pack module 220, sensor module 260, and communications module 240 may be attachable and removable from each other. Screw column 248 may be centered in housing 238. Housing 238 may be configured so that cover 210 may be attached to housing 238 by clipping or snapping into place.

Communication module 240 may be in communication with sensor module 220. Communication printed circuit board assembly (PCBA) 242 may receive monitoring data 75 from processor 68. Communication printed circuit board assembly (PCBA) 242 may include a communications substrate, Bluetooth unit 70, and cellular unit 72. Bluetooth unit 70 and cellular unit 72 may be mounted on communications substrate of communication printed circuit board assembly (PCBA) 242. Monitor 200 may be in communication with smartphone 80 or other device over network 85. Network 85 may be a local network, a Bluetooth network, a cellular network, a direct connection, or a Wi-Fi network. Bluetooth unit 70 may provide Bluetooth low energy communication capabilities for monitor 200. Cellular unit 72 may provide Wi-Fi and cellular communication abilities for monitor 200. Cellular unit 72 providing Wi-Fi and cellular communication abilities may allow monitor 200 to provide data collection of monitoring data 75 generated processor 68 of sensor module 260. Cellular unit 72 providing cellular communication abilities may allow monitor 200 to communicate with smartphone 80 or another device and send monitoring data 75 to smartphone 80 or another device over a connection that could effectively be worldwide. Monitor 200 may communicate with smartphone 80 or other device on a continuing basis or on a monitoring interval. A monitoring interval may be adjustable from 5 seconds to 1 hour. Smartphone 80 or other device may include a program or application 82 for analyzing data 75. A processor of smartphone 80 may execute application 82 and generate motor analytics based on data 75 collected by vibration sensor 60, temperature sensor 62, temperature sensor 63, motor flux sensor 64, and ultrasonic sensor 66. A processor of smartphone 80 may execute application 82 and determine a fault based on a frequency within the magnetic flux emitted by machine 55 as detected by motor flux sensor 64. A processor of smartphone 80 may execute application 82 and detect defects in the bearings such as bearing faults, wear in the bearings, flat spots in the bearings, or seizing of the bearings based on the reflected ultrasonic waves as detected by ultrasonic sensor 66.

Cover 210 may be plastic and may be translucent or frosted. Indicators 26 may be visible through cover 210 when indicator 26 light up. Cover 210 may be printed or embossed with a brand. Indicators 26 may light up within cover 210 and a color of an indicator 26 may be seen through cover 210. For example, an indicator 26 of the monitor may be a green LED, may be lit to indicate a status of monitor 200. Cover 210 may be illuminated green by indicator 26 revealing green as a status of monitor 200.

Battery pack module 220 may include a box shaped housing 228, one or more batteries 222, and an electrical connector 224. Housing 228 may include walls 230 defining a screw column 232 which may allow screw 250 to secure battery pack module 220 to another module such as sensor module 260 and communication module 240. Screw column 230 may be centered in housing 228.

Sensor module 260 may include a box shaped housing 258, a sensor printed circuit board assembly (PCBA) 262, and an electric connector 264. Housing 258 may include walls 266 which may define center screw mount 268. Center screw mount 268 may be configured to threadedly receive a screw such as screw 250. Housing 258 may further include mount feet 249. Mount feet 249 may be part of a three point mount and may provide a stiff connection to machine 55 for high frequency detection. Monitor 200 may include a threaded mount fastener. Monitor 200 may further include a magnetic mount 290. Magnetic mount 290 may be a rare earth magnet. Magnetic mount 290 may secure monitor 200 to a metal surface of machine 55 or may facilitate mounting with embedded rare earth magnets within the machine.

Sensor printed circuit board assembly (PCBA) 262 may include a substrate, vibration sensor 60, temperature sensor 62, temperature sensor 63, motor flux sensor 64, ultrasonic sensor 66, and processor 68. Vibration sensor 60, temperature sensor 62, temperature sensor 63, motor flux sensor 64, and ultrasonic sensor 66 may each be mounted on the substrate of sensor printed circuit board assembly (PCBA) 262. Vibration sensor 60 may detect a vibration frequency in three axes. Vibration sensor 60 may be effective to produce a vibration signal relating to vibration of machine 55. Vibration sensor 60 may detect a vibration frequency in a range of 2 Hz To 4 kHz. Temperature sensor 62 may detect a temperature near a surface of machine 55. Temperature sensor 63 may detect a temperature of ambient air around monitor 100. Temperature sensor 62, and temperature sensor 63, may each detect a difference in temperature between temperature of a surface of machine 55 and ambient air. Temperature sensor 62 and temperature sensor 63 may be effective to produce a temperature signal relating to a temperature detected. Motor flux sensor 64 may detect an amount of magnetic flux emitted by machine 55. Motor flux sensor 64 may be effective to produce a motor flux signal relating to an amount of motor flux emitted by machine 55. Ultrasonic sensor 66 may emit ultrasonic waves toward machine 55 and may receive ultrasonic waves reflected back from machine 55. Ultrasonic sensor 55 may monitor bearings of machine 55. Ultrasonic sensor 66 may be effective to produce an ultrasonic signal relating to ultrasonic waves reflected back from machine 55. Processor 68 may be in communication with vibration sensor 60, temperature sensor 62, temperature sensor 63, motor flux sensor 64, and ultrasonic sensor 66. Processor 68 may receive vibration signal from vibration sensor 60, temperature signal from temperature sensor 62 and temperature sensor 63, motor flux signal from motor flux sensor 64, and ultrasonic signal from ultrasonic sensor 66. Processor 68 may generate monitoring data 75 based on information collected from signals received from vibration sensor 60, temperature sensor 62, temperature sensor 63, motor flux sensor 64, and ultrasonic sensor 66. Processor 68 may send monitoring data 75 to Bluetooth unit 70 and cellular unit 72.

Figure 3:
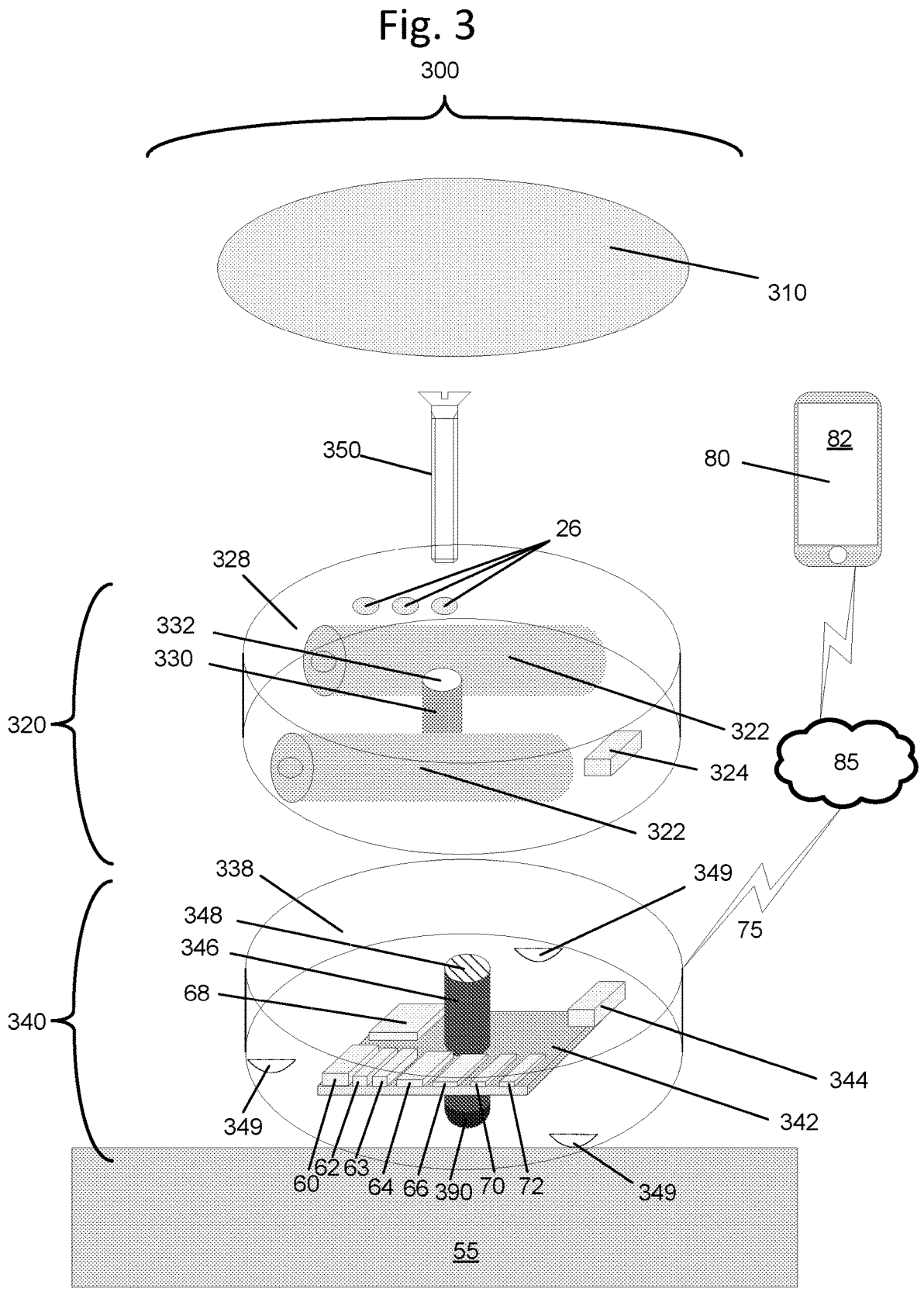
FIG. 3 is a side exploded view of a modular monitor.

FIG. 3 is side exploded view of a modular monitor, arranged in accordance with at least some embodiments described herein. Those components in FIG. 3 that are labeled identically to components of FIGS. 1-2 will not be described again for the purposes of brevity.

Monitor 300 may include a cover 310, a battery pack module 320, and a sensor and communication module 340. Monitor 300 may be attached to machine 55 and may monitor characteristics of machine 55. Battery pack module 320 may include a cylinder shaped housing 328, one or more batteries 322, an electrical connector 324, and one or more indicators 26. Battery pack module 320 and batteries 322 may be replaceable. Batteries 322 may be rechargeable. Housing 328 may include walls 330 defining a screw column 332 which may allow a screw 350 to secure battery pack module 320 to another module such as sensor and communication module 340. Battery pack module 320 and sensor and communications module 340 may be attachable and removable from each other. Housing 328 may be configured so that cover 310 may be attached to housing 328 by clipping or snapping onto housing 328. Screw column 330 may be centered in housing 328. Sensor and communication module 340 may include a cylinder shaped housing 338, a sensor and communication printed circuit board assembly (PCBA) 342, and an electric connector 344. Housing 338 may include walls 346 which may define center screw mount 348. Center screw mount 348 may be configured to threadedly receive a screw such as screw 350. Housing 338 may further include mount feet 349. Mount feet 349 may be part of a three point mount and may provide a stiff connection to machine 55 for high frequency detection. Monitor 300 may include a threaded mount fastener. Monitor 300 may further include magnetic mount 390. Magnetic mount 390 may be a rare earth magnet. Magnetic mount 390 may secure monitor 300 to a metal surface of machine 55 or may facilitate mounting with embedded rare earth magnets within the machine.

Monitor 300 including cover 310, battery pack module 320 and sensor and communication module 340 may be waterproof at connections between cover 310, battery pack module 320 and sensor and communication module 340. Monitor 300 may comply with ingress protection standard IP68 and IP69K. Monitor 300 may be compliant with class 1, division 1 or class 1, division 2 work environments.

Cover 310 may be plastic and may be translucent or frosted. Cover 310 may be printed or embossed with a brand. Indicators 26 may be visible through cover 310 when one or more indicators 26 light up. Indicators 26 may light up within cover 310 and a color of an indicator 26 may be seen through cover 310.

Sensor and communication printed circuit board assembly (PCBA) 342 may include a substrate, vibration sensor 60, temperature sensor 62, temperature sensor 63, motor flux sensor 64, ultrasonic sensor 66, processor 68, Bluetooth unit 70, and cellular unit 72. Vibration sensor 60, temperature sensor 62, temperature sensor 63, motor flux sensor 64, ultrasonic sensor 66, Bluetooth unit 70, and cellular unit 72 may each be mounted on the substrate of sensor printed circuit board assembly (PCBA) 342. Processor 68 may be in communication with vibration sensor 60, temperature sensor 62, temperature sensor 63, motor flux sensor 64, and ultrasonic sensor 66. Processor 68 may receive vibration signal from vibration sensor 60, temperature signal from temperature sensor 62, temperature signal from temperature sensor 63, motor flux signal from motor flux sensor 64, and ultrasonic signal from ultrasonic sensor 66. Processor 68 may generate monitoring data 75 based on signals from vibration sensor 60, temperature sensor 62, temperature sensor 63, motor flux sensor 64, and ultrasonic sensor 66. Monitor 300 may be in communication with smartphone 80 or other device, such as a device on a cloud network, over a network 85. Network 85 may be a local network, a Bluetooth network, a cellular network, a direct connection, a Wi-Fi network, etc. Bluetooth unit 70 may provide Bluetooth low energy communication capabilities for monitor 300. Cellular unit 72 may provide Wi-Fi and cellular communication abilities for monitor 300. Cellular unit 72 providing Wi-Fi and cellular communication abilities may allow monitor 300 to provide data collection of monitoring data 75 generated by vibration sensor 60, temperature sensor 62, temperature sensor 63, motor flux sensor 64, and ultrasonic sensor 66. Cellular unit 72 providing cellular communication abilities may allow monitor 300 to communicate with smartphone 80 or another device and send monitoring data 75 to smartphone 80 or another device over a connection range that could effectively be worldwide. Monitor 300 may communicate with smartphone 80 or other device on a continuing basis or on a monitoring interval. A monitoring interval may be adjustable from 5 seconds to 1 hour. Smartphone 80 or other device, such as a device on a cloud network, may include a program or application 82 for analyzing data 75. A processor of smartphone 80 may execute application 82 and generate motor analytics based on data 75 generated by processor 68. A processor of smartphone 80 may execute application 82 and determine a fault based on a frequency within the magnetic flux emitted by machine 55 as detected by motor flux sensor 64. A processor of smartphone 80 may execute application 82 and detect defects in the bearings such as bearing faults, wear in the bearings, flat spots in the bearings, or seizing of the bearings based on the reflected ultrasonic waves as detected by ultrasonic sensor 66.

Figure 4:
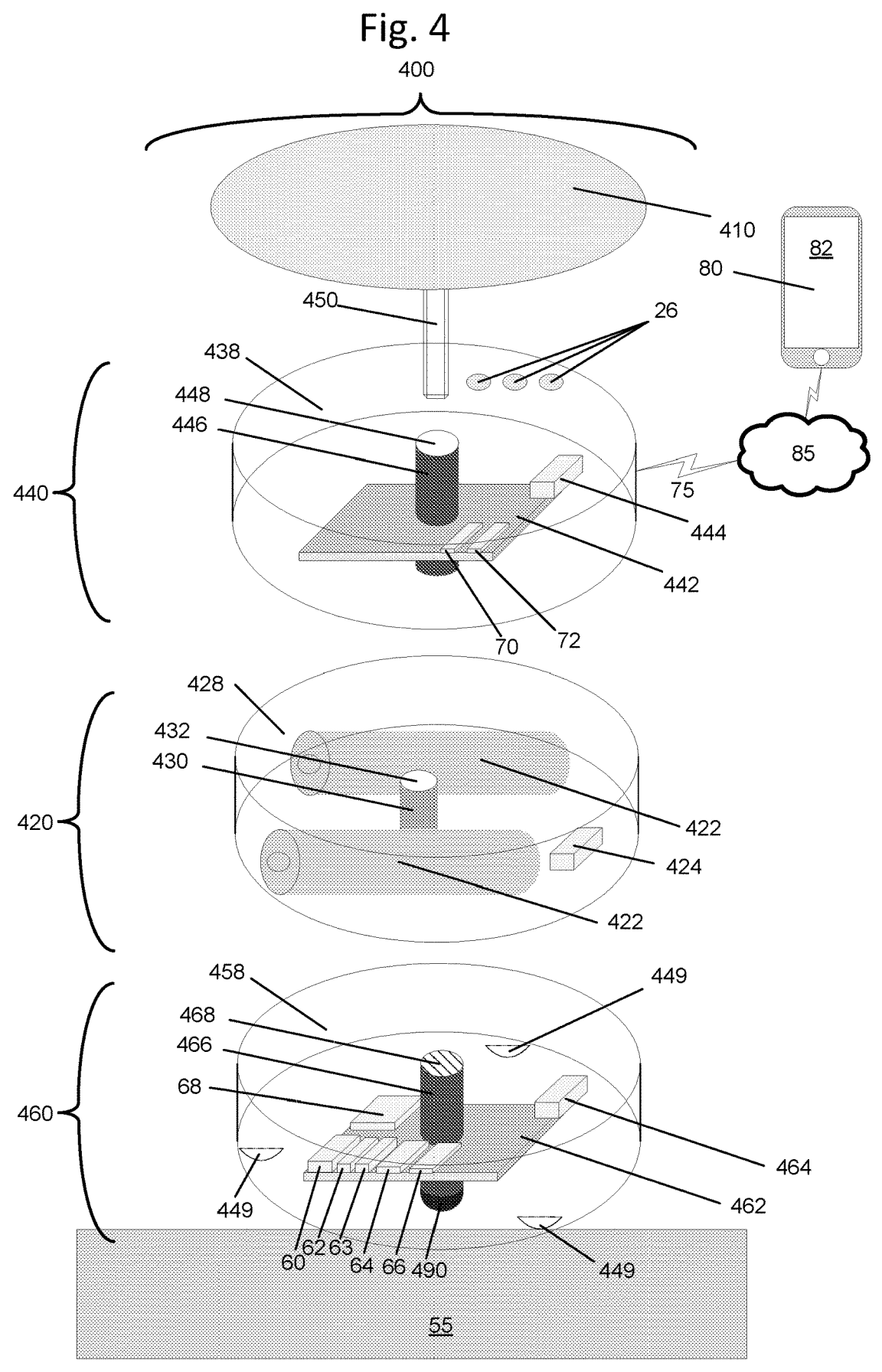

FIG. 4 is a side exploded view of a modular monitor, arranged in accordance with at least some embodiments described herein. Those components in FIG. 4 that are labeled identically to components of FIGS. 1-3 will not be described again for the purposes of brevity.

Monitor 400 may include a cover 410, a communication module 440, a battery pack module 420, and a sensor module 460. Monitor 400 may be attached to machine 55 and may monitor characteristics of machine 55. Monitor 400 may be waterproof at connections between cover 410, communication module 440, battery pack module 420, and sensor module 460. Monitor 400 may comply with ingress protection standard IP69K. Monitor 400 may be compliant with class 1, division 1 or class 1, division 2 work environments.

Communication module 440 may include a cylinder shaped housing 438, a communication printed circuit board assembly (PCBA) 442, an electric connector 444, and one or more indicators 26. Indicators 26 may be light emitting diodes (LEDs). Housing 438 may include walls 446 which may define a center screw column 448. Center screw column 448 may allow a screw, such as screw 450, to secure communication module 440 to one or more other modules such as battery pack module 420 and sensor module 460. Battery pack module 420, sensor module 460, and communications module 440 may be attachable and removable from each other. Screw column 448 may be centered in housing 248. Housing 438 may be configured so that cover 410 may be attached to housing 438 by clipping or snapping into place.

Communication module 440 may be in communication with sensor module 420. Communication printed circuit board assembly (PCBA) 442 may include a communications substrate, Bluetooth unit 70, and cellular unit 72. Bluetooth unit 70 and cellular unit 72 may be mounted on communications substrate of communication printed circuit board assembly (PCBA) 442. Communication printed circuit board assembly (PCBA) 442 may receive monitoring data 75 from processor 68. Monitor 400 may be in communication with smartphone 80 or other device over network 85. Network 85 may be a local network, a Bluetooth network, a cellular network, a direct connection, or a Wi-Fi network. Bluetooth unit 70 may provide Bluetooth low energy communication capabilities for monitor 200. Cellular unit 72 may provide Wi-Fi and cellular communication abilities for monitor 400. Cellular unit 72 providing Wi-Fi and cellular communication abilities may allow monitor 400 to provide data collection of monitoring data 75 generated by vibration sensor 60, temperature sensor 62, temperature sensor 63, motor flux sensor 64, and ultrasonic sensor 66 of sensor module 260. Cellular unit 72 providing cellular communication abilities may allow monitor 400 to communicate with smartphone 80 or another device, such as a device on a cloud network, and send monitoring data 75 to smartphone 80 or another device over a connection range that could effectively be worldwide. Monitor 400 may communicate with smartphone 80 or other device on a continuing basis or on a monitoring interval. A monitoring interval may be adjustable from 5 seconds to 1 hour. Smartphone 80 or other device may include a program or application 82 for analyzing data 75. A processor of smartphone 80 may execute application 82 and generate motor analytics based on data 75 collected by vibration sensor 60, temperature sensor 62, temperature sensor 63, motor flux sensor 64, and ultrasonic sensor 66. A processor of smartphone 80 may execute application 82 and determine a fault based on a frequency within the magnetic flux emitted by machine 55 as detected by motor flux sensor 64. A processor of smartphone 80 may execute application 82 and detect defects in the bearings such as bearing faults, wear in the bearings, flat spots in the bearings, or seizing of the bearings based on the reflected ultrasonic waves as detected by ultrasonic sensor 66.

Cover 410 may be plastic and may be translucent or frosted. Cover 410 may be printed or embossed with a brand. Indicators 26 may be visible through cover 410 when indicator 26 light up. Indicators 26 may light up within cover 410 and a color of an indicator 26 may be seen through cover 410.

Battery pack module 420 may include a cylinder shaped housing 428, one or more batteries 422, and an electrical connector 424. Housing 428 may include walls 430 defining a screw column 432 which may allow screw 450 to secure battery pack module 420 to another module such as sensor module 460 and communication module 440. Screw column 430 may be centered in housing 428.

Sensor module 460 may include a cylinder shaped housing 458, a sensor printed circuit board assembly (PCBA) 462, and an electric connector 244. Housing 458 may include walls 466 which may define center screw mount 468. Center screw mount 468 may be configured to threadedly receive a screw such as screw 450. Housing 458 may further include mount feet 449. Mount feet 449 may be part of a three point mount and may provide a stiff connection to machine 55 for high frequency detection. Monitor 400 may include a threaded mount fastener. Monitor 400 may further include a magnetic mount 490. Magnetic mount 490 may be a rare earth magnet. Magnetic mount 490 may secure monitor 400 to a metal surface of machine 55 or may facilitate mounting with embedded rare earth magnets within the machine.

Sensor printed circuit board assembly (PCBA) 462 may include a substrate, vibration sensor 60, temperature sensor 62, temperature sensor 63, motor flux sensor 64, ultrasonic sensor 66, and processor 68. Vibration sensor 60, temperature sensor 62, temperature sensor 63, motor flux sensor 64, and ultrasonic sensor 66 may each be mounted on the substrate of sensor printed circuit board assembly (PCBA) 462.

Figure 5:
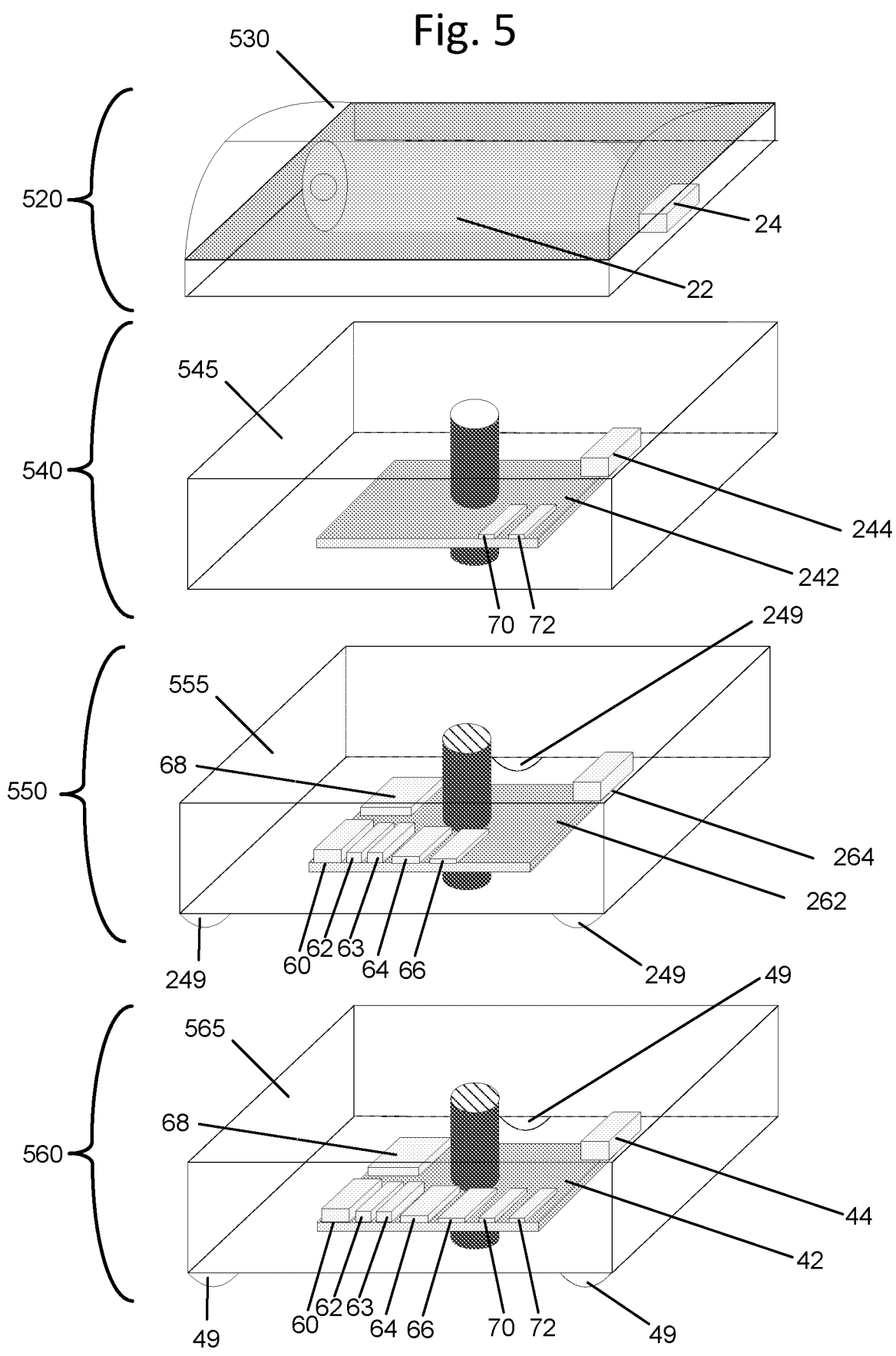
FIG. 5 is a side exploded view of a modular monitor.

FIG. 5 is a side exploded view of a modular monitor, arranged in accordance with at least some embodiments described herein. Those components in FIG. 5 that are labeled identically to components of FIGS. 1-4 will not be described again for the purposes of brevity.

In another embodiment, battery pack 520 may include a housing 530, battery 22, and electrical connector 24. Battery pack 520 may be configured to be attachable to and removable from a communication module 540, a sensor module 550, or a sensor and communication module 560. Communication module 540 may include communication printed circuit board assembly (PCBA) 242, Bluetooth unit 70, cellular unit 72, and electric connector 244. Sensor module 550 may include vibration sensor 60, temperature sensor 62, temperature sensor 63, motor flux sensor 64, ultrasonic sensor 66, processor 68, sensor printed circuit board assembly (PCBA) 262, and electric connector 264. Sensor and communication module 560 may include vibration sensor 60, temperature sensor 62, temperature sensor 63, motor flux sensor 64, ultrasonic sensor 66, processor 68, Bluetooth unit 70, cellular unit 72, sensor and communication printed circuit board assembly (PCBA) 42, and electric connector 44. Housing 530 of battery pack 520 may be configured to clip onto a housing 545 of communication module 540, a housing 555 of sensor module 550, or a housing 565 of sensor and communication module 560.

For example, in one configuration, battery pack 520 may be attached to sensor module 550 by housing 530 clipping onto housing 555 of sensor module 550. In another example, battery pack 520 may be attached to communication module 540 by housing 530 clipping onto housing 545 of communication module 540 and communication module 540 may be attached to sensor module 550. In another example battery pack 520 may be attached to sensor and communication module 560 by housing 530 clipping onto housing 555 of sensor and communication module 560.

Figure 6:
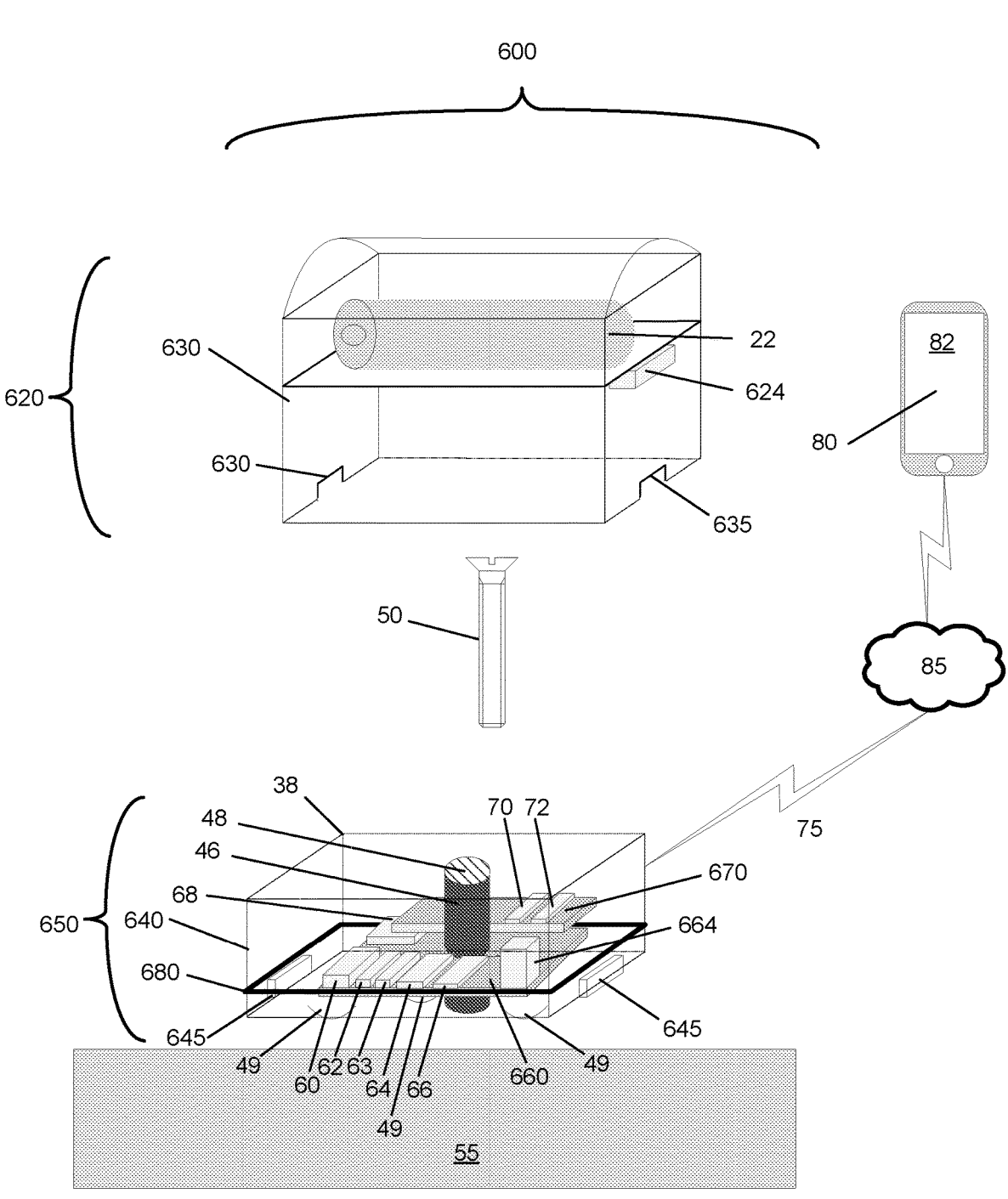
FIG. 6 is a side exploded view of a modular monitor.

FIG. 6 is a side exploded view of a modular monitor, arranged in accordance with at least some embodiments described herein. Those components in FIG. 6 that are labeled identically to components of FIGS. 1-5 will not be described again for the purposes of brevity.

In another embodiment, monitor 600 may include battery pack 620 and sensor module 650. Battery pack 620 may include a housing 630, battery 22, and an electrical connector 624. Housing 630 of battery pack 620 may be configured to overlap a housing 640 of sensor module 650 so as to encase a top and sides of sensor module 650 within housing 630 and a bottom of sensor module 650 may not be encased in housing 630. Housing 630 of battery pack 620 may be configured to be attachable to and removable from housing 640 of sensor module 650. Housing 640 of sensor module 650 may include fasteners 645. Fasteners 645 may be clips or snapping mechanisms. Housing 630 of battery pack 620 may include slots 635. Fasteners 645 may be configured to interact with slots 635 to secure housing 630 of battery pack 620 to housing 640 of sensor module 650. Electrical connector 624 of battery pack module 620 may connect with an electrical connector 664 of sensor module 650 when housing 630 of battery pack 620 is secured to housing 640 of sensor module 650. Housing 640 of sensor module 650 may include an O-ring 680. O-ring 680 may seal housing 640 of sensor module 650 to housing 630 of battery pack 620 and may prevent ingress of water. An overlap of the housing 630 of battery pack over housing 640 of sensor module along with seal provided by O-ring 680 may isolate an electrical connection and/or disconnection of the electrical power between battery pack 620 and sensor module 650 from an environment outside of monitor 600 and may provide Hazardous Locations Certification C1D1. A spark created by electrical connection and/or disconnection of the electrical power between battery pack 620 and sensor module 650 may be isolated from the environment outside of module 600.

Sensor module 650 may be configured to include one or more printed circuit board assemblies. Sensor module 650 may include a sensor printed circuit board assembly (PCBA) 660. Vibration sensor 60, temperature sensor 62, temperature sensor 63, motor flux sensor 64, ultrasonic sensor 66, processor 68, and electric connector 664 may be mounted on a substrate of sensor printed circuit board assembly (PCBA) 660. Sensor module 650 may include only sensor printed circuit board assembly (PCBA) 660 or sensor module 650 may further include a communication printed circuit board assembly (PCBA) 670 connected to and in communication with sensor printed circuit board assembly (PCBA) 660. Bluetooth unit 70 and cellular unit 72 may be mounted on a substrate of communication printed circuit board assembly (PCBA) 670.

A device in accordance with the present disclosure may allow a user to customize a monitor with different modular battery, communications, and/or sensor modules and components. A device in accordance with the present disclosure may provide a user with the option to switch between expensive and cost effective monitoring solutions. A device in accordance with the present disclosure may provide a user with a monitor that can detect a change in vibration in a range of 2 Hz. to 4000 Hz. A device in accordance with the present disclosure may provide a user with monitor with improved bearing fault detection.

A device in accordance with the present disclosure may provide a user with monitor that can communicate with another user device over the internet and provide real time data collection. A device in accordance with the present disclosure may provide a user with a monitor that can be branded on the cover. A device in accordance with the present disclosure may provide a user with a monitor that may be mounted by a threaded fastener. A device in accordance with the present disclosure may provide a user with a monitor that may be mounted by use of rare earth magnets embedded in a pump and in the monitor.

A device in accordance with the present disclosure may provide a user with a monitor that can provide data sampling on a five second interval. A device in accordance with the present disclosure may provide a user with a monitor that is closer to the equipment which allows for better monitoring of vibration. A device in accordance with the present disclosure may provide a user with a monitor that may be upgraded without requiring a redesign. A device in accordance with the present disclosure may provide a user with monitor that has a connection range that could effectively be worldwide. A device in accordance with the present disclosure may allow a user to replace a battery without removing the device from the equipment.

Figure 7:
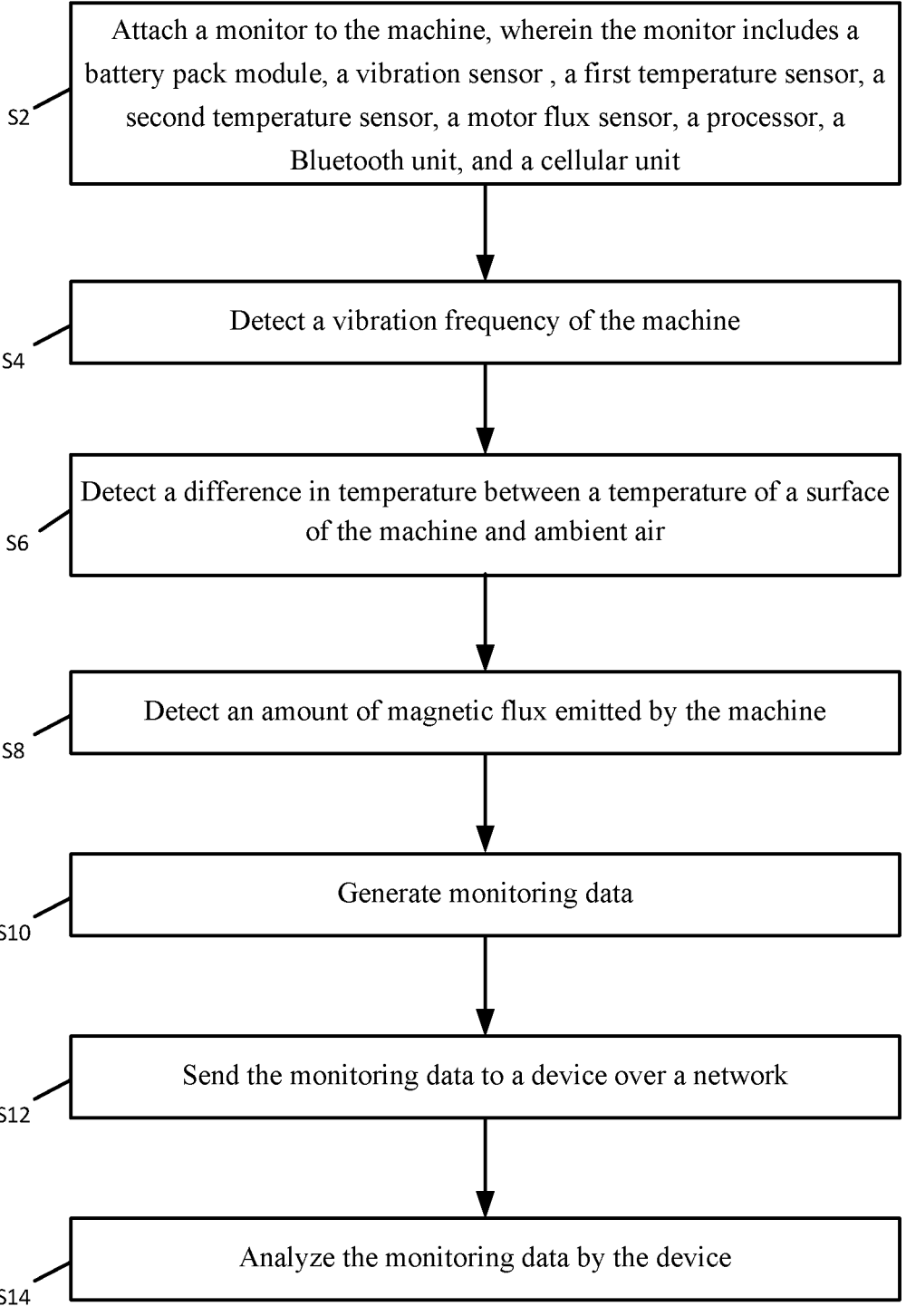
FIG. 7 illustrates a flow diagram for an example process to monitor a machine, all arranged according to at least some embodiments described herein.

FIG. 7 illustrates a flow diagram for an example process to monitor a machine, arranged in accordance with at least some embodiments presented herein. An example process may include one or more operations, actions, or functions as illustrated by one or more of blocks S2, S4, S6, S8, S10, S12, and/or S14. Although illustrated as discrete blocks, various blocks may be divided into additional blocks, combined into fewer blocks, or eliminated, depending on the desired implementation.

Processing may begin at block S2, "Attach a monitor to the machine, wherein the monitor includes a cover, a battery pack module, a vibration sensor, a first temperature sensor, a second temperature sensor, a motor flux sensor, a processor, a Bluetooth unit, and a cellular unit". At block S2, a monitor may be attached to the machine. The monitor may include a cover, a battery pack module, a vibration sensor, a temperature sensor, a motor flux sensor, an ultrasonic sensor, a processor, a Bluetooth unit, and a cellular unit.

Processing may continue from block S2 to block S4, "Detect a vibration frequency of the machine". At block S4, the vibration sensor may detect a vibration frequency of the machine. The vibration sensor may produce a vibration signal.

Processing may continue from block S4 to block S6, "Detect a difference in temperature between a temperature of a surface of the machine and ambient air". At block S6, the temperature sensor may detect a difference in temperature between a temperature of a surface of the machine and ambient air. The temperature sensor may produce a temperature signal.

Processing may continue from block S6 to block S8, "Detect an amount of magnetic flux emitted by the machine". At block S8, the magnetic flux sensor may detect an amount of magnetic flux emitted by the machine. The magnetic flux sensor may produce a magnetic flux signal.

Processing may continue from block S8 to block S10, "Generate monitoring data". At block S10, the processor may generate monitoring data. The processor may be in communication with the vibration sensor, the temperature sensor, the motor flux sensor, and the ultrasonic sensor. The processor may receive the vibration signal from the vibration sensor, the temperature signal from the temperature sensor, the motor flux signal from the motor flux sensor, and the ultrasonic signal from the ultrasonic sensor. The processor may generate the monitoring data based on information collected from the signals received from the vibration sensor, the temperature sensor, the motor flux sensor, and the ultrasonic sensor.

Processing may continue from block S10 to block S12, "Send the monitoring data to a device over a network". At block S12, the monitoring data may be sent by the monitor to a device over a network.

Processing may continue from block S12 to block S14, "Analyze the monitoring data by the device". At block S14, the monitoring data may be analyzed by the device. This analysis may include edge computing. The device may execute an application to analyze the monitoring data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device to monitor a machine, the device comprising:
   a battery pack housing;
   said battery pack housing including therein a battery pack module; and
   a sensor module housing;
   said sensor module housing including therein a sensor module;
   said battery pack housing being configured to be attachable and removable from said sensor module housing;
   said sensor module including a circuit board;
   said circuit board including
      a substrate,
      a vibration sensor mounted on said substrate and configured to produce a vibration signal relating to vibration of the machine, a temperature sensor mounted on said substrate and configured to produce a temperature signal relating to a detected temperature, a motor flux sensor mounted on said substrate and configured to produce a motor flux signal relating to an amount of motor flux emitted by the machine, and a processor mounted on said substrate and in communication with said vibration sensor, said temperature sensor, and said motor flux sensor;

said battery pack housing being configured such an interior of side walls of said battery pack housing overlaps exterior of side walls of said sensor module housing;

said battery pack housing being configured to form a top for said sensor module housing and encase said side walls of said sensor module housing within said battery pack housing;

said battery pack housing including slots;

said sensor module housing including fasteners and an O-ring;

said fasteners being integral to said sensor module housing and configured to interact with said slots to secure said battery pack housing to said sensor module housing;

said O-ring being located on said exterior of said side walls of said sensor module housing such that said O-ring engages said interior of said side walls of said battery pack housing when said battery pack housing overlaps said sensor module housing.

2. The device of claim 1, further comprising:

a communications module;

said communications module including a communication module housing configured to be attachable and removable from the battery pack module;

said communications module being in communication with said sensor module;

said communications module including a communications circuit board;

said communications circuit board including a communications substrate; and a cellular unit mounted on the communications substrate.

3. The device of claim 2, wherein said processor generates monitoring data based on said vibration signal, said temperature signal, and said motor flux signal.

4. The device of claim 1, wherein said sensor module further includes a communication circuit board connected to said circuit board said communication circuit board including a Bluetooth™ unit mounted on a substrate of said communication circuit board and a cellular unit mounted on said substrate of said communication circuit board.

5. The device of claim 4, wherein said processor generates monitoring data based on said vibration signal, said temperature signal, and said motor flux signal.

6. The device of claim 1, wherein said motor flux sensor detects an amount of magnetic flux emitted by the machine;

said processor configured to sends data related to the amount of magnetic flux emitted by the machine to a device in communication with said processor over a network to determines a fault based on a frequency within the magnetic flux detected.

7. The device of claim 4, wherein said processor sends data to a device in communication with said processor over a network to generates motor analytics.

8. The device of claim 1 wherein said overlapping of said battery pack housing and said sensor module housing along with a seal provided by said O-ring isolates an electrical connection between said battery pack and said sensor module from an outside environment.

9. The device of claim 1 wherein said sensor module housing includes three mount feet.

10. The device of claim 1 wherein said sensor module housing includes a magnetic mount, said magnetic mount includes rare earth magnet.

\* \* \* \* \*